(12) United States Patent
Strock et al.

(10) Patent No.: US 10,221,698 B2
(45) Date of Patent: Mar. 5, 2019

(54) POLYMER-COATED BLADE WITH ABRASIVE TIP

(71) Applicant: United Technologies Corporation, Hartford, CT (US)

(72) Inventors: Christopher W. Strock, Kennebunk, ME (US); Russell A. Beers, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 638 days.

(21) Appl. No.: 14/592,933

(22) Filed: Jan. 9, 2015

(65) Prior Publication Data

US 2015/0233255 A1  Aug. 20, 2015

Related U.S. Application Data

(60) Provisional application No. 61/939,923, filed on Feb. 14, 2014.

(51) Int. Cl.
*F01D 5/20* (2006.01)
*F01D 5/28* (2006.01)
*F02C 3/10* (2006.01)

(52) U.S. Cl.
CPC .............. *F01D 5/20* (2013.01); *F01D 5/284* (2013.01); *F02C 3/10* (2013.01)

(58) Field of Classification Search
CPC ... F01D 5/147; F01D 5/20; F01D 5/28; F01D 5/284; F01D 5/286; F01D 5/288; F01D 11/122; F01D 11/125; F01D 25/005; F05D 2240/307; F05D 2240/31; F05D 2260/95; F05D 2300/121; F05D 2300/134; F05D 2300/173; F05D 2300/2112; F02C 3/10
See application file for complete search history.

(56) References Cited

U.S. PATENT DOCUMENTS

| 4,735,656 | A | * | 4/1988 | Schaefer | ............... | B22F 3/1035 |
| | | | | | | 419/13 |
| 5,141,400 | A | | 8/1992 | Murphy et al. | | |
| 5,264,011 | A | | 11/1993 | Brown et al. | | |

(Continued)

FOREIGN PATENT DOCUMENTS

| EP | 1681440 | 7/2006 |
| EP | 2449216 | 5/2012 |

OTHER PUBLICATIONS

"Matrix", Jun. 27, 2014, American Heritage Dictionary, pp. 1-2.*

(Continued)

*Primary Examiner* — Richard A Edgar
*Assistant Examiner* — Alexander A White
(74) *Attorney, Agent, or Firm* — Carlson, Gaskey & Olds, P.C.

(57) ABSTRACT

A blade includes an airfoil section extending between leading and trailing edges, first and second opposed sides each joining the leading and trailing edges, and an inner end and a free tip end. The airfoil section is formed of a metal-based material with a polymeric overcoat on at least one of the leading edge, trailing edge, first side and second side. The airfoil section includes an abrasive tip at the free tip end. The abrasive tip has a composition selected with respect to heat-induced delamination of the polymeric overcoat from frictional heat generated during rubbing of the abrasive tip.

20 Claims, 2 Drawing Sheets

(56) References Cited

U.S. PATENT DOCUMENTS

| | | | | |
|---|---|---|---|---|
| 5,423,475 A | * | 6/1995 | Burke | C23C 16/27 |
| | | | | 228/193 |
| 5,478,510 A | * | 12/1995 | Moltgen | C04B 35/1115 |
| | | | | 264/140 |
| 5,551,840 A | | 9/1996 | Benoit et al. | |
| 5,952,110 A | | 9/1999 | Schell et al. | |
| 8,616,847 B2 | * | 12/2013 | Allen | C25D 7/10 |
| | | | | 29/889.1 |
| 2008/0226879 A1 | * | 9/2008 | Strock | C23C 4/04 |
| | | | | 428/195.1 |
| 2008/0286108 A1 | * | 11/2008 | Lui | C23C 24/04 |
| | | | | 416/229 R |
| 2014/0010663 A1 | * | 1/2014 | Parkos, Jr. | F01D 5/147 |
| | | | | 416/241 R |

OTHER PUBLICATIONS

"Matrix", Sep. 26, 2016, Oxford Dictionaries, pp. 1-2.*
European Search Report for European Patent Application No. 15154887.2 completed Jul. 9, 2015.

* cited by examiner

POLYMER-COATED BLADE WITH ABRASIVE TIP

CROSS-REFERENCE TO RELATED APPLICATION

This application claims priority to U.S. Provisional Application No. 61/939,923, filed Feb. 14, 2014.

BACKGROUND

This disclosure relates to abrasive tips for rotatable blades. Abradable seals or coatings (rub coatings) can be used to protect moving parts from damage during rub interaction while providing a small clearance. Such seals are used in turbomachines to interface with abrasive tips of a rotating blade stage.

SUMMARY

A blade according to an example of the present disclosure includes an airfoil section extending between leading and trailing edges, first and second opposed sides each joining the leading and trailing edges, and an inner end and a free tip end. The airfoil section is formed of a metal-based material with a polymeric overcoat on at least one of the leading edge, trailing edge, first side and second side. The airfoil section includes an abrasive tip at the free tip end. The abrasive tip has a composition selected with respect to heat-induced delamination of the polymeric overcoat from frictional heat generated during rubbing of the abrasive tip.

In a further embodiment of any of the foregoing embodiments, the abrasive tip includes a metal matrix and hard particles dispersed through the metal matrix.

In a further embodiment of any of the foregoing embodiments, the metal matrix and the metal-based material are compositionally composed of the same predominant metal.

In a further embodiment of any of the foregoing embodiments, the metal is aluminum.

In a further embodiment of any of the foregoing embodiments, the metal matrix is a eutectic aluminum-silicon alloy.

In a further embodiment of any of the foregoing embodiments, the metal matrix of the abrasive tip interfaces with the metal-based material.

In a further embodiment of any of the foregoing embodiments, the metal matrix is aluminum and the hard particles include alumina.

In a further embodiment of any of the foregoing embodiments, the metal matrix is aluminum and the hard particles include zirconia.

In a further embodiment of any of the foregoing embodiments, the abrasive tip includes, by volume, 0.1-50% of the hard particles.

In a further embodiment of any of the foregoing embodiments, the abrasive tip includes, by volume, 5-15% of the hard particles.

In a further embodiment of any of the foregoing embodiments, the abrasive tip has a thickness in a thickness range of 0.025-1.3 millimeters, the hard particles have an average maximum dimension in a particle size range of 10-200 micrometers but not exceeding the thickness.

In a further embodiment of any of the foregoing embodiments, the hard particles are faceted.

A further embodiment of any of the foregoing embodiments includes a bonding agent selected from the group consisting of a metallic bond coat, a polymeric material, and combinations thereof.

In a further embodiment of any of the foregoing embodiments, the bonding agent includes the polymeric material, the polymeric material forming a layer having a thickness of 0.0254-3.175.

A gas turbine engine according to an example of the present disclosure includes a compressor section, a combustor in fluid communication with the compressor section, a turbine section in fluid communication with the combustor, and a fan rotatably coupled with the turbine section. The fan includes a plurality of circumferentially-spaced rotatable blades. Each of the blades include an airfoil section extending between leading and trailing edges, first and second opposed sides each joining the leading and trailing edges, and an inner end and a free tip end. The airfoil section is formed of a metal-based material with a polymeric overcoat on at least one of the leading edge, trailing edge, first side and second side. Each airfoil section includes an abrasive tip at the free tip end, and a seal circumscribing the plurality of circumferentially-spaced rotatable blades. The seal is contactable with, and abradable by, the abrasive tip, wherein the respective compositions of the seal and the abrasive tip are complimentarily selected with respect to frictional heat generated and heat-induced delamination of the polymeric overcoat.

A fan rotor system according to an example of the present disclosure includes a plurality of circumferentially-spaced rotatable blades, each of the blades including an airfoil section extending between leading and trailing edges, first and second opposed sides each joining the leading and trailing edges, and an inner end and a free tip end. The airfoil section is formed of a metal-based material with a polymeric overcoat on at least one of the leading edge, trailing edge, first side and second side. Each airfoil section includes an abrasive tip at the free tip end, and a seal circumscribing the plurality of circumferentially-spaced rotatable blades. The seal is contactable with, and abradable by, the abrasive tip, wherein the respective compositions of the seal and the abrasive tip are complimentarily selected with respect to frictional heat generated and heat-induced delamination of the polymeric overcoat.

In a further embodiment of any of the foregoing embodiments, the abrasive tip includes a metal matrix and hard particles dispersed through the metal matrix.

In a further embodiment of any of the foregoing embodiments, the metal matrix and the metal-based material are compositionally composed of the same predominant metal.

In a further embodiment of any of the foregoing embodiments, the metal is aluminum.

In a further embodiment of any of the foregoing embodiments, the metal-based material is a eutectic aluminum-silicon alloy.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
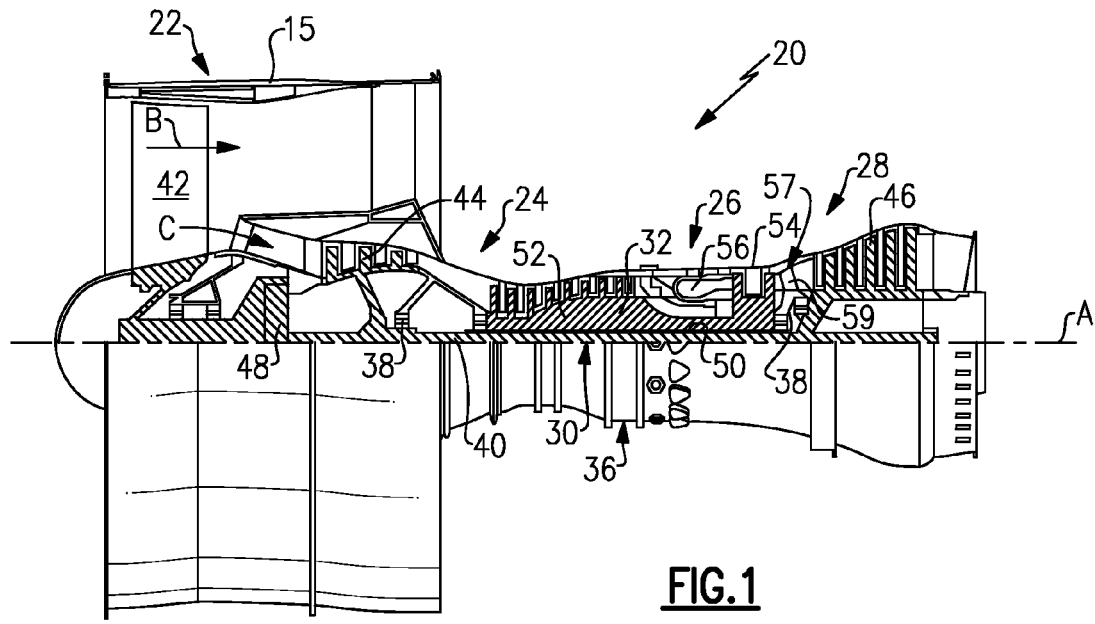
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, and into a core flow path C to the compressor section 24 for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption" (TSFC)—is the industry standard parameter of lbm of fuel being burned divided by lbf of thrust the engine produces at that operating point. "low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °\ R)/(518.7° \ R)]^{0.5}$. The "Low corrected fan tip speed" as disclosed herein according to one non-limiting embodiment is less than about 1150 ft/second.

Figure 2:
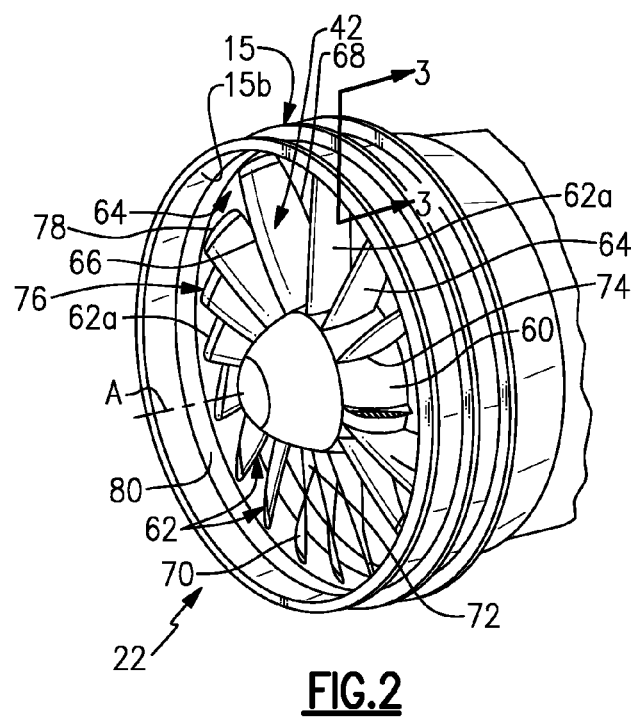
FIG. 2 illustrates an isolated view of the fan section of the gas turbine engine of FIG. 1.

FIG. 2 illustrates an isolated view of the fan section 22 of the engine 20. The fan 42 includes a rotor 60 that has a plurality of circumferentially-spaced blades 62. Each blade 62 includes an airfoil section 64 that extends between leading and trailing edges 66/68, first and second opposed sides 70/72 that each joins the leading and trailing edges 66/68, and an inner end 74 and a free tip end 76. Each blade includes an abrasive tip 78 at the free tip end 76.

The fan case 15 is annular in shape and circumscribes the blades 62. The fan section 22 is designed such that the abrasive tips 78 of the blades 62 rub against the fan case 15 during rotation. In this regard, the fan case 15 includes an abradable seal 80 mounted on a radially inner side of the fan case 15. The abradable seal 80 is formed of a polymeric-based material, such as a polymer matrix composite. In one further example, the polymer matrix composite includes an epoxy matrix and a silica-containing filler dispersed through the matrix. In a further example, the silica-containing filler is or includes hollow glass microspheres. An example is 3M™ Scotch-Weld™ Structural Void Filling Compound EC-3555.

When two components are in rubbing contact, at least one of the components may wear. The term "abradable" refers to the one of the two components that wears, while the other component is "abrasive" and does not wear or wears less. Thus, when the abrasive tips 78 of the blades 62 rub against the seal 80, the seal 80 will be worn whereas the abrasive tips 78 will not wear or will wear less than the seal 80. The word "abrasive" thus also implies that there is or can be contact with an abradable component.

Figure 3:
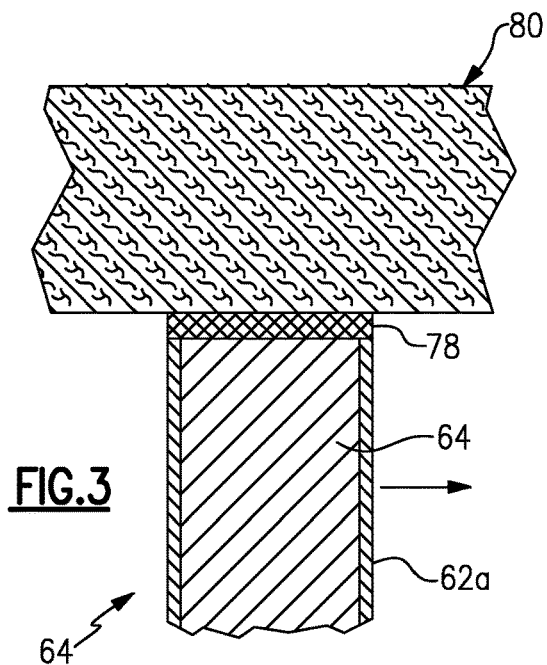
FIG. 3 illustrates an abrasive tip interfacing with an abradable seal.

FIG. 3 shows a cutaway view of a representative portion of the airfoil section 64 of one of the blades 62 and a portion of the abradable seal 80. The airfoil section 64 is formed of a metal-based material with a polymeric overcoat 62a on the surfaces thereof. For example, the polymeric overcoat 62a serves to protect the underlying airfoil section 64 from erosion due to foreign particulate ingested into the engine 20. In one example, the metal-based material of the airfoil section 64 is an aluminum alloy.

The polymeric coating 62a can be a polyurethane-based coating, an epoxy-based coating, or a silicone rubber-based coating, but is not limited to these types of polymeric coatings or materials. The polymeric coating 62a can cover the first and second sides 70/72 of the blades 62 and can span the entire lateral surface of the blade 62 between the leading and trailing edges 66/68.

Friction between a blade tip and a surrounding case generates heat. The heat can be conducted into the case, into the blade, or both. However, in particular for metal blades and polymeric-based cases, the metal of the blade is generally a better thermal conductor than the polymer of the case, and a majority of the heat thus can conduct into the blade. While this may normally not present any detriments for a plain metal blade, the heat conduction can be detrimental to a metal blade that has a polymeric overcoat because the heat can cause delamination of the polymeric overcoat and thus compromise the erosion protection. In this regard, the abrasive tip 78 has a composition selected with respect to heat-induced delamination of the polymeric overcoat 62a from frictional heat generated during rubbing between the abrasive tip 78 and the abradable seal 80. That is, the respective compositions of the abradable seal 80 and the abrasive tip 78 are complimentarily selected with respect to frictional heat generated and heat-induced delamination of the polymeric overcoat 62a. For example, the compositions are selected with regard to a blade temperature at which the polymeric overcoat 62a does not delaminate or has a defined delamination durability over an extended period of time, such as the life of the engine 20.

Figure 4:
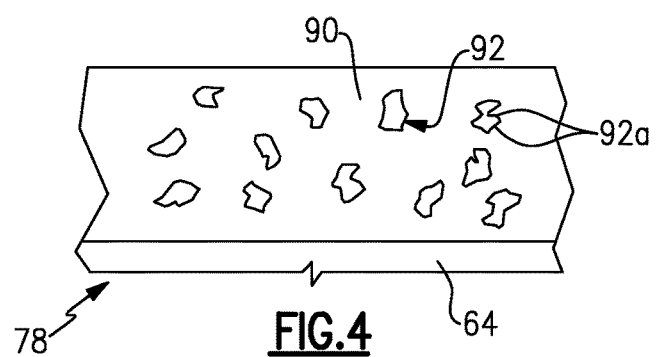
FIG. 4 illustrates a cross-section of an abrasive tip.

FIG. 4 illustrates a cross-section of representative portion of a further example of the abrasive tip 78. In this example, the abrasive tip 78 includes a metal matrix 90 and hard particles 92 dispersed through the metal matrix 90. In one further example, the metal matrix 90 and the metal-based material of the airfoil section 64 are compositionally composed of the same predominant metal, which can promote strong adhesion if the abrasive tip 78 interfaces with the metal-based material (i.e., the abrasive tip 78 is in direct contact with the metal-based material, as depicted in FIG. 4). As an example, the metal can be aluminum.

In one further example, the metal matrix 90 is a eutectic aluminum-silicon alloy having a composition, by atomic weight, of 88% aluminum and 12% silicon. The eutectic composition provides high hardness and strength to enhance holding the hard particles 92 in the metal matrix 90. The eutectic composition also has good high temperature properties and retains strength at high temperatures rather than softening.

In one further example, the metal matrix 90 is, or predominantly includes, aluminum, and the hard particles 92 are, or predominantly include, alumina ($Al_2O_3$). In an additional example, the hard particles 92 are, or predominantly include, zirconia ($ZrO_2$). In yet another example, the hard particles 92 are, or predominantly include, alumina and zirconia. It is to be understood that the hard particles 92 are not limited to alumina and zirconia, and other oxides, nitrides, carbides, oxycarbides, oxynitrides, diamond and combinations thereof can be used selectively, with respect to heat-induced delamination of the polymeric overcoat 62a from frictional heat generated during rubbing between the abrasive tip 78 and the abradable seal 80.

The abrasive tip 78 can have a thickness in a thickness range of 0.025-1.3 millimeters, and the hard particles 92 can have an average maximum dimension in a particle size range of 10-200 micrometers. The hard particles 92 may protrude from the metal matrix 90 or be completely covered by the metal matrix.

In one further example a polymer matrix filled with hollow glass microspheres for the abradable seal 80 is complimentary with a metal matrix 90 of aluminum and hard particles 92 of alumina, zirconia, or both in the abrasive tip 78, with respect to frictional heat generated and heat-induced delamination of the polymeric overcoat 62a. That is, the frictional heat generated between the abradable seal 80 and the abrasive tip 78 cause a blade 62 temperature at which the example polymer of the polymeric overcoat 62a does not delaminate, or at least meets a delamination durability over an extended period of time, such as the life of the engine 20.

In a further example, the abrasive tip 78 includes, by volume, 0.1-50% of the hard particles 92. For the above example based on use of a polymer matrix filled with hollow glass microspheres for the abradable seal 80 and a metal matrix 90 of aluminum and hard particles 92 of alumina, zirconia, or both in the abrasive tip 78, an amount of 5-15% of the hard particles 92 can be used.

In the illustrated example in FIG. 4, the hard particles 92 are faceted and thus have angled facets 92a. The angled facets 92a provide relatively sharp corners that facilitate efficient "cutting" through the abradable seal 80 with low cutting forces, which lowers frictions and, in turn, contributes to lowering the amount of heat generated. In one example, the hard particles 92 are DURALUM ATZ II that have approximately 40% tetragonal zirconia with titania evenly distributed throughout the individual alumina grains.

Figure 5:
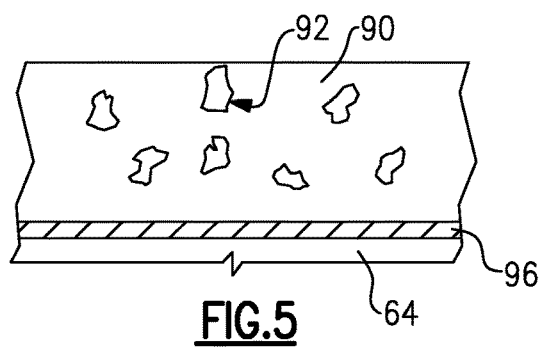
FIG. 5 illustrates a cross-section of another example in which a metallic bond coat bonds an abrasive tip to an airfoil section.

In another example shown in FIG. 5, an optional bonding agent 96 serves to facilitate bonding between the abrasive tip 78 and the metal-based material of the airfoil section 64. In one example, the bonding agent 96 is a metallic bond coat that is located primarily between the abrasive tip 78 and the metal-based material of the airfoil section 64 and serves to enhance adhesion. For a metal matrix 90 of aluminum and a metal-based material of aluminum (of the airfoil section 64), the metallic bond coat can be, or can predominantly include, nickel and aluminum. If galvanic effects between dissimilar metals of the metallic bond coat and the abrasive tip 78 and/or airfoil portion 64 are of concern, the metallic bond coat can be excluded and a bonding agent 96 of an adhesive/sealant material can be used instead to improve corrosion resistance in the presence of moisture and also increase bonding strength.

The adhesive/sealant material can be a polymeric-based material, such as, but not limited to, an epoxy or an epoxy-based material. The adhesive/sealant material can infiltrate or partially infiltrate into pores of the abrasive tip 78 such that the abrasive tip 78, or at least a portion thereof, and the underlying airfoil section 64 are protected from corrosion. In a further example, the abrasive tip 78 can be primarily directly bonded to the metal-based material of the airfoil section 64, and the adhesive/sealant can fill or partially fill gaps or pores along the interface of the abrasive tip 78 and the underlying airfoil section 64 to further enhance adhesion. In further examples, the adhesive/sealant could be, or could additionally be used as, an over-layer on top of the abrasive tip 78 to help close the tip gaps to the abradable seal 80, such as for the shorter blades. On longer blades the adhesive/sealant may rapidly wear down until the abrasive tip 78 starts cutting the abradable seal 80. In further examples, the adhesive/sealant can have an over-layer thickness of 0.0254-3.175 millimeters, and in some examples a thickness of 0.254-1.27 millimeters.

The abrasive tip 78 can be a coating that is deposited onto the airfoil section 64, or metallic bond coat 96, if used. For example, a thermal spray technique can be used, in which one or more feedstocks are fed into a thermal plume. The feedstock can include individual powder feedstocks of the metal of the metal matrix 90 and the hard particles 92, or a single mixed feedstock powder of the metal of the metal matrix 90 and the hard particles 92. In another alternative, the powder feedstock can include composite particles of the metal of the metal matrix 90 and the hard particles 92. Composite particles can include the metal and hard particles 92 in agglomeration or structured particles that have a hard particle 92 core and the metal overcoated around the core. The hard particles 92 are not melted during the thermal spray deposition. The deposition process can be controlled to avoid melting or substantial melting, to ensure that the hard particles 92 retain the faceted geometry described above. It is desirable to retain as much of the faceted geometry as possible so that the cutting forces and heat generation are minimized during rub contact. In other alternatives, the abrasive tip 78 can be pre-fabricated and then attached to the airfoil section 64, such as with an adhesive.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade comprising:
an airfoil section extending between leading and trailing edges, first and second opposed sides each joining the leading and trailing edges, and an inner end and a free tip end,
the airfoil section being formed of a metal-based material with a polymeric overcoat on at least one of the leading edge, trailing edge, first side and second side,
the airfoil section including an abrasive tip at the free tip end, and
the abrasive tip having a composition selected with respect to heat-induced delamination of the polymeric overcoat from frictional heat generated during rubbing of the abrasive tip, wherein the abrasive tip includes a metal matrix and hard particles dispersed through the metal matrix, and the metal matrix is a eutectic aluminum-silicon alloy and the hard particles include at least one of alumina or zirconia.

2. The blade as recited in claim 1, wherein the metal matrix and the metal-based material are compositionally composed of the same predominant metal.

3. The blade as recited in claim 1, wherein the metal matrix of the abrasive tip interfaces with the metal-based material.

4. The blade as recited in claim 1, wherein the hard particles include alumina.

5. The blade as recited in claim 1, wherein the hard particles include zirconia.

6. The blade as recited in claim 1, wherein the abrasive tip includes, by volume, 0.1-50% of the hard particles.

7. The blade as recited in claim 1, wherein the abrasive tip includes, by volume, 5-15% of the hard particles.

8. The blade as recited in claim 1, wherein the abrasive tip has a thickness in a thickness range of 0.025-1.3 millimeters, and the hard particles have an average maximum dimension in a particle size range of 10-200 micrometers but not exceeding the thickness.

9. The blade as recited in claim 1, wherein the hard particles are faceted.

10. The blade as recited in claim 1, further comprising a bonding agent selected from the group consisting of a metallic bond coat, a polymeric material, and combinations thereof.

11. The blade as recited in claim 10, wherein the bonding agent includes the polymeric material, the polymeric material forming a layer having a thickness of 0.0254-3.175 millimeters.

12. The blade as recited in claim 1, wherein the hard particles include tetragonal zirconia distributed throughout alumina grains.

13. The blade as recited in claim 12, wherein the abrasive tip has a thickness in a thickness range of 0.025-1.3 millimeters, and the hard particles have an average maximum dimension in a particle size range of 10-200 micrometers but not exceeding the thickness.

14. The blade as recited in claim 12, wherein the hard particles protrude from the metal matrix.

15. The blade as recited in claim 12, wherein the abrasive tip includes, by volume, 5-15% of the hard particles.

16. The blade as recited in claim 1, wherein the hard particles include diamond.

17. A gas turbine engine comprising:
a compressor section;
a combustor in fluid communication with the compressor section;
a turbine section in fluid communication with the combustor;
a fan rotatably coupled with the turbine section, the fan including a plurality of circumferentially-spaced rotatable blades, each of the plurality of circumferentially-spaced rotatable blades including an airfoil section extending between leading and trailing edges, first and second opposed sides each joining the leading and trailing edges, and an inner end and a free tip end, the airfoil section being formed of a metal-based material with a polymeric overcoat on at least one of the leading edge, trailing edge, first side and second side, and each airfoil section including an abrasive tip at the free tip end; and
a seal circumscribing the plurality of circumferentially-spaced rotatable blades, the seal being contactable with, and abradable by, the abrasive tip, wherein
respective compositions of the seal and the abrasive tip are complimentarily selected with respect to frictional heat generated and heat-induced delamination of the polymeric overcoat, wherein the abrasive tip includes a metal matrix and hard particles dispersed through the metal matrix, and the metal matrix is a eutectic aluminum-silicon alloy and the hard particles include at least one alumina or zirconia.

18. A fan rotor system comprising:

a plurality of circumferentially-spaced rotatable blades, each of the plurality of circumferentially-spaced rotatable blades including an airfoil section extending between leading and trailing edges, first and second opposed sides each joining the leading and trailing edges, and an inner end and a free tip end, the airfoil section being formed of a metal-based material with a polymeric overcoat on at least one of the leading edge, trailing edge, first side and second side, and each airfoil section including an abrasive tip at the free tip end, wherein the abrasive tip includes a metal matrix and hard particles dispersed through the metal matrix, and the metal matrix is a eutectic aluminum-silicon alloy and the hard particles include at least one of the alumina or zirconia; and a seal circumscribing the plurality of circumferentially-spaced rotatable blades, the seal being contactable with, and abradable by, the abrasive tip, wherein respective compositions of the seal and the abrasive tip are complimentarily selected with respect to frictional heat generated and heat-induced delamination of the polymeric overcoat.

19. The fan rotor system as recited in claim 18, wherein the metal matrix and the metal-based material are compositionally composed of the same predominant metal.

20. The fan rotor system as recited in claim 18, wherein the metal-based material is a eutectic aluminum-silicon alloy.

* * * * *